United States Patent
Xu et al.

(10) Patent No.: US 8,572,322 B2
(45) Date of Patent: Oct. 29, 2013

(54) ASYNCHRONOUSLY SCHEDULING MEMORY ACCESS REQUESTS

(75) Inventors: Kun Xu, Austin, TX (US); David B Kramer, Cedar Park, TX (US); James A. Welker, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 440 days.

(21) Appl. No.: 12/748,600

(22) Filed: Mar. 29, 2010

(65) Prior Publication Data

US 2011/0238934 A1 Sep. 29, 2011

(51) Int. Cl.
  *G06F 13/12* (2006.01)
(52) U.S. Cl.
  USPC ........................................................ 711/122
(58) Field of Classification Search
  None
  See application file for complete search history.

(56) References Cited

U.S. PATENT DOCUMENTS

| | | |
|---|---|---|
| 6,178,493 B1 | 1/2001 | Lenk et al. |
| 6,212,611 B1 | 4/2001 | Nizar et al. |
| 6,510,497 B1 | 1/2003 | Strongin et al. |
| 6,591,349 B1 | 7/2003 | Steinman et al. |
| 6,928,494 B1 * | 8/2005 | Volk et al. ........................ 710/52 |
| 7,155,582 B2 | 12/2006 | Ross |
| 7,394,716 B1 * | 7/2008 | Chakrapani et al. ...... 365/230.03 |
| 2003/0061459 A1 * | 3/2003 | Aboulenein et al. .......... 711/167 |
| 2005/0091460 A1 | 4/2005 | Rotithor et al. |
| 2007/0136545 A1 | 6/2007 | Kommrusch |
| 2009/0109770 A1 * | 4/2009 | Sugishita ..................... 365/193 |
| 2009/0150624 A1 | 6/2009 | Resnick |
| 2010/0077140 A1 * | 3/2010 | Abraham et al. ............. 711/106 |

OTHER PUBLICATIONS

Final Office Action mailed Dec. 20, 2012 for U.S. Appl. No. 12/748,617, 16 pages.
Non-Final Office Action mailed Aug. 23, 2012 for U.S. Appl. No. 12/748,617, 18 pages.

* cited by examiner

*Primary Examiner* — Duc Doan (57) ABSTRACT

A data processing system employs a scheduler to schedule pending memory access requests and a memory controller to service scheduled pending memory access requests. The memory access requests are asynchronously scheduled with respect to the clocking of the memory. The scheduler is operated using a clock signal with a frequency different from the frequency of the clock signal used to operate the memory controller. The clock signal used to clock the scheduler can have a lower frequency than the clock used by a memory controller. As a result, the scheduler is able to consider a greater number of pending memory access requests when selecting the next pending memory access request to be submitted to the memory for servicing and thus the resulting sequence of selected memory access requests is more likely to be optimized for memory access throughput.

20 Claims, 4 Drawing Sheets

ASYNCHRONOUSLY SCHEDULING MEMORY ACCESS REQUESTS

CROSS-REFERENCE TO RELATED APPLICATIONS

The present application is related to co-pending U.S. patent application Ser. No. 12/748,617, entitled "SCHEDULING MEMORY ACCESS REQUESTS USING PREDICTED MEMORY TIMING AND STATE INFORMATION" and filed on even date herewith, the entirety of which is incorporated by reference herein.

FIELD OF THE DISCLOSURE

The present disclosure relates generally to data processing systems, and more particularly to scheduling memory access requests in data processing systems.

BACKGROUND

The operating performance of a data processing system can depend on the rate at which information can be stored and retrieved at a memory device. Many types of memory, such as double data rate (DDR) dynamic random access memory (DRAM), operate at higher levels of access efficiency when memory accesses are scheduled, or reordered, so that the same local region of a memory is consecutively accessed. While single-core processors or single-thread applications frequently can exhibit this locality, the implementation of multiple processor cores or multi-threaded applications typically results in an interleaving of memory access requests to disparate locations in the memory. As a result, multi-core processors and multi-threaded applications can render conventional memory access scheduling techniques ineffective.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-6 illustrate example techniques for scheduling memory access requests in a data processing system. In accordance with one aspect, a data processing system employs an improved arbitration process in selecting pending memory access requests received from the one or more processor cores for servicing by the memory. This arbitration process uses memory timing and state information pertaining both to memory access requests already submitted to the memory for servicing and to the pending memory access requests which have not yet been selected for servicing by the memory. The memory timing and state information can include: information identifying the currently open row for each bank of the memory; information identifying the time remaining before the next activate command can be initiated for a each bank of the memory; information identifying the time remaining before a precharge operation can be initiated for each bank of the memory; information identifying the time remaining before an initiated precharge operation for a bank has been completed; information identifying which pending memory access requests addressed to the same pages of memory; and combinations thereof. In one embodiment, the memory timing and state information may be predicted memory timing and state information; that is, the component of the data processing system that implements the improved scheduling algorithm may not be able to determine the exact point in time at which a memory controller initiates a memory access for a corresponding memory access request and thus the component maintains information that estimates or otherwise predicts the particular state of the memory at any given time.

Other criteria, such as starvation-prevention mechanisms, also can be considered by the scheduling algorithm in selecting the next pending memory access request to be submitted for servicing by the memory. By considering the memory timing and state information pertaining to both pending memory access requests not yet selected for servicing and to memory access requests already selected for servicing, the improved arbitration process can select the next memory access request to be serviced by the memory in a manner that adapts to the particular state of the memory so as to achieve a greater throughput and reduced latency of memory accesses.

In accordance with another aspect of the present disclosure, memory access requests are asynchronously scheduled with respect to the clocking of the memory. To this end, the circuitry implementing the scheduler is operated using a clock signal with a frequency different from the frequency of the clock signal used to operate the circuitry that implements each memory access. In one embodiment, the clock signal used to clock the scheduler has a lower frequency than the clock used by a memory access controller. As a result, the scheduler is able to consider a greater number of pending memory access requests when selecting the next pending memory access request to be submitted to the memory for servicing compared to conventional schedulers that operate in the same clock domain as the memory access controller. Because a greater number of pending memory access requests can be considered in the scheduling process, the resulting sequence of selected memory access requests is more likely to be optimized for memory access throughput. This asynchronous memory scheduling technique can employ the improved arbitration process described herein. However, the asynchronous memory instead can use one or more conventional memory access scheduling algorithms, or a combination of one or more conventional memory access scheduling algorithms and the improved arbitration process described herein.

Figure 1:
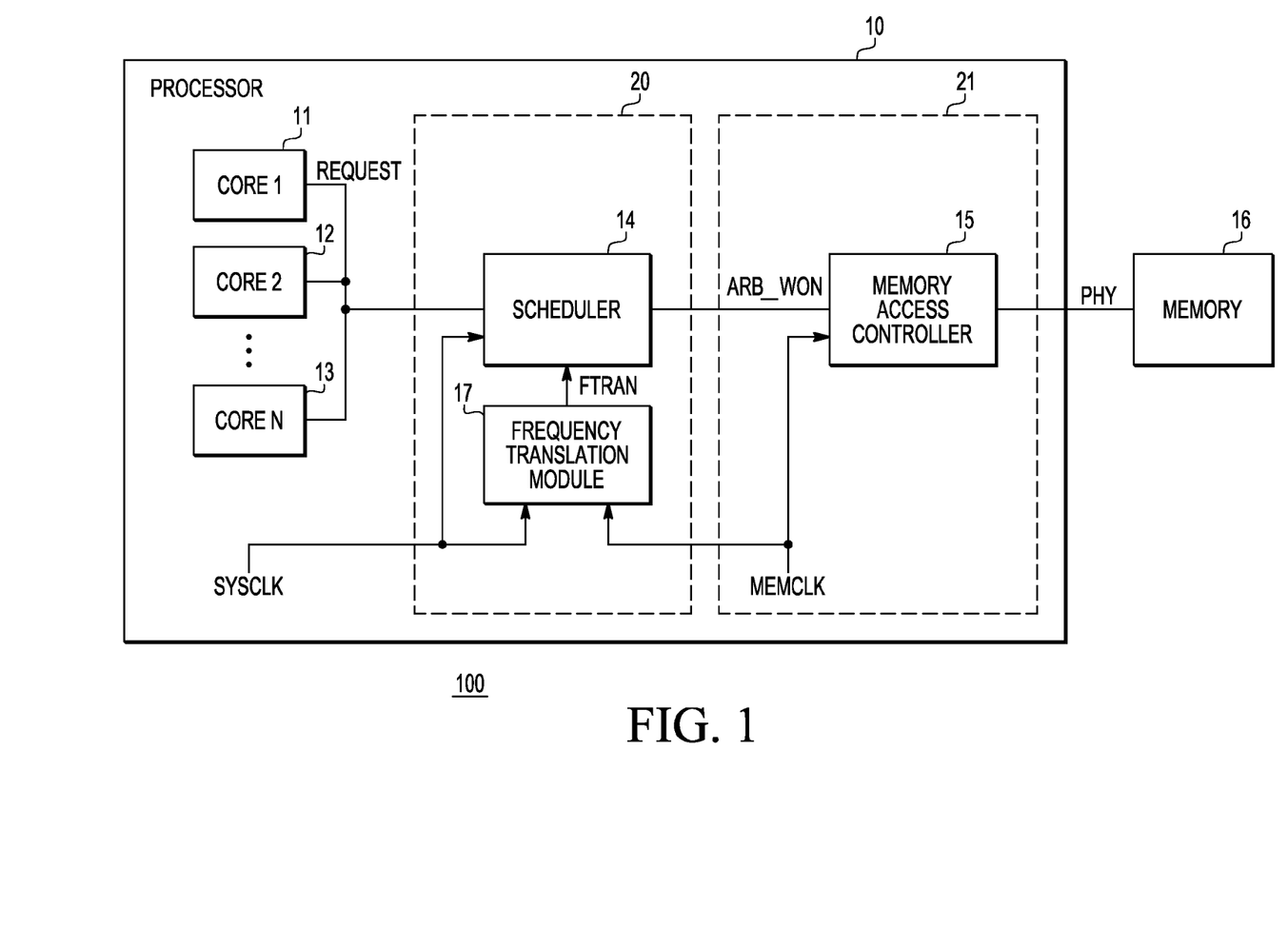
FIG. 1 is a block diagram illustrating a data processing system in accordance with a specific embodiment of the present disclosure.

FIG. 1 is a block diagram illustrating an example data processing system 100 implementing memory access scheduling in accordance with at least one embodiment of the present disclosure. The data processing system 100 includes a processor 10 and a memory 16. The memory 16 can include any of a variety of memory types, including dynamic random access memory (DRAM), static random access memory (SRAM), and the like. In a particular embodiment, the memory 16 includes a dual data rate (DDR) SRAM or DDR DRAM memory, and the techniques of the present disclosure are described in this context for ease of illustration. However, these techniques are not limited to DDR memory architectures. The processor 10 includes one or more processor cores, including processor cores 11, 12, and 13. The processor 10 further includes a scheduler 14, a memory controller 15, and a frequency translation module 17. For clarity, FIG. 1 omits other components of the data processing system 100 whose operation is well known to those of ordinary skill in the art, such as cache memory devices, external interfaces, and the like.

Each processor core includes circuitry configured to execute software and perform related operations. The operation of a processor core often requires frequent access to the memory 16, such as when performing read accesses to obtain stored data from the memory 16 or when performing write accesses to store data to the memory 16. A memory access is initiated by a processor core as a memory access request, which is scheduled for servicing by the memory 16 via the scheduler 14. The scheduler 14 receives memory access requests generated processor cores 11-13 via a node labeled REQUEST. Received memory access requests are buffered as pending memory access requests at a request queue of the scheduler 14 (not shown at FIG. 1). The scheduler 14 implements an arbitration process that evaluates at least a subset of the pending memory access requests so as to select the next pending memory access request that is to be issued to the memory controller 15 for servicing by the memory 16, whereby the selected pending memory access request is submitted to the memory controller 15 via node ARB_WON (arbitration won). The particular order in which the pending memory access requests are selected for servicing specifies a memory access sequence in which the memory controller 15 conducts memory accesses corresponding to the pending requests. The operation of the scheduler 14 is described below with reference to FIGS. 3-6.

The memory controller 15 operates to conduct signaling with the memory 16, via node PHY, so as to perform memory accesses in an order specified by the sequence in which corresponding memory access requests are selected by the scheduler 14. Accordingly, the memory controller 15 performs each memory access by providing the memory 16 with suitable sequences of commands in conjunction with address information and, for write accesses, data information on signal lines (not shown). In one embodiment, the memory 16 is a DDR DRAM or DDR SRAM, whereby "DDR" is nomenclature that refers to a family of memory standards (collectively referred to herein as the singular "DDR standard"), including DDR, DDR2, and DDR3, and subsequent generations within the DDR family, such as the DDR4 standards currently under development. Pursuant to the DDR standard, a DDR memory is logically/physically divided into a plurality of banks, each bank comprising a plurality of rows. A location to be accessed in a DDR memory is specified by an address that can be partitioned into a plurality of fields, including a chip select field that selects a particular chip of the memory, a bank select field that selects a particular bank of the selected chip, a row address field that selects a particular row within the selected bank, and a column address field that selects a particular subset of columns of the selected row. Consistent with conventional DDR nomenclature, a particular row at a particular bank is referred to herein as a "page."

Memory accesses to a DDR memory are subject to various timing constraints due to the circuit architecture of a DDR memory and due to timing parameters specified in the DDR standard defined by the Joint Electron Devices Engineering Council (JEDEC) standards organization. When accessing a particular row of a bank that is different than the last row accessed at the same bank, the memory controller 15 must issue an ACTIVATE command (also known as a BANK ACTIVE command) to access the new row so as to initialize the input/output (I/O) circuitry of the memory 16 in preparation for accessing the specified row. Further, before activating a new row at the bank, the previously accessed row of the bank must be deactivated by issuing a PRECHARGE command. A DDR memory typically requires a minimum delay between the initiation of a precharge operation (via issuance of a PRECHARGE command) to a bank and the initiation of an activate operation (via issuance of an ACTIVATE command) for opening another row of the same bank for access. This delay typically is referred to as the "row precharge time" and is represented by the parameter "tRP." While various examples of the techniques of the present application are described in the context of DDR memory, these techniques can be implemented in other memory architectures without departing from the scope of the present disclosure.

A DDR memory also typically requires a minimum delay between the initiation of an activation operation (via issuance of an ACTIVATE command) for a bank and the subsequent initiation of a precharge operation (via issuance of a PRECHARGE command) to the same bank. This delay typically is referred to as the "row active time" and is represented by the parameter "tRAS." That is, the row active time tRAS is the time needed by the memory to internally refresh the corresponding row. Parameters tRP and tRAS are typically expressed in the form of a specified number of clock cycles of the clock signal used to clock the DDR memory. For example, a DDR memory specification may specify tRP as a delay substantially equal to seven cycles and specify tRAS as a delay substantially equal to fifteen cycles, the particular number of clock cycles based on the operating frequency of the DDR memory.

The precharge and activate operations add additional delay (latency) before a memory access can be performed. Consecutive memory accesses sharing the same page address (and thus only varying with respect to column address) do not incur additional delay necessary to perform the precharge/activate operations between each memory access, and thus memory access throughput is increased. In at least one embodiment, the scheduler 14 employs an improved arbitration process to schedule pending memory accesses so as to reduce or minimize the impact of the memory timing requirements associated with the precharge and activate operations used to conduct memory accesses. The improved arbitration process utilizes memory timing and state information pertaining to both those memory access requests that have already been selected and submitted to the memory controller 15 for servicing, as well as those pending memory access requests that have yet to be selected for servicing. The criteria by which scheduler 14 reorders, or schedules, memory access requests can include an evaluation of presently open rows, a prediction of memory timing information associated with closed rows, access latency requirements, and bank and row information associated with pending access requests. This improved arbitration process is described in greater detail below with reference to FIGS. 3-6.

In another embodiment, improved memory access throughput is achieved by operating the scheduler 14 asynchronously relative to the clocking of the memory controller 15 and the memory 16. To illustrate, FIG. 1 depicts an example implementation whereby the circuitry of the memory controller 15 is clocked by a memory clock signal (hereinafter, "MEMCLK"), whereas at least a portion of the circuitry of the scheduler 14 is clocked by a system or platform clock signal (hereinafter, "SYSCLK"), one or more of bus interfaces (not shown), and the like. In this example, the scheduler 14 is identified as operating in a SYSCLK domain 20 and the memory controller 15 is identified as operating in a MEMCLK domain 21. In one embodiment, the clock SYSCLK has a lower frequency than the clock MEMCLK. By operating the scheduler 14 in the slower SYSCLK domain 20, the scheduler 14 can consider a greater number of buffered pending memory access requests in selecting a pending memory access request for servicing compared to a conventional approach wherein the scheduling circuitry is operated by the same clock as used to clock the memory. Because a larger number of buffered pending memory access requests can be considered, the scheduler 14 is more likely to select a more optimal sequence of memory access requests that achieves a greater memory access throughput than in instances whereby a smaller number of pending memory access requests is considered. Operating the scheduler 14 at a slower frequency than the memory access controller 15 allows the scheduler 14 to employ a greater number of logic levels (logic gates included between clocked logic elements) to perform the arbitration process. Traditional pipelining techniques may not be suitable for implementing arbitration and reordering functions. In one embodiment, the asynchronous scheduling by the scheduler 14 includes the use of improved arbitration process described herein. Alternatively, this asynchronous scheduling can employ a conventional scheduling algorithm, or a combination of one or more conventional scheduling algorithms and the improved arbitration process described herein.

The memory timing parameters tRP and tRAS typically are represented as corresponding numbers of clock cycles of the memory clock MEMCLK. As described in greater detail herein, the scheduler 14 predicts the current state of corresponding banks of the memory 16 using, in part, timing values initially set to representations of the memory timing parameters tRP and tRAS. However, when the scheduler 14 is asynchronously clocked relative to the memory 16, the scheduler 14 can employ the frequency translation module 17 to identify a ratio of the frequency of the clock signal MEMCLK to the frequency of the clock signal SYSCLK or some other identifier of the relationship between these two clock signals. To illustrate, the frequency translation module 17 can count the number of cycles of clock signal MEMCLK that occur during an interval corresponding to a specified number of cycles of clock signal SYSCLK (e.g., the number of MEMCLK cycles that occur during ten SYSCLK cycles). The scheduler 14 then can use the resulting frequency relationship to translate the memory timing parameters tRAS and tRP from the MEMCLK clock domain 21 to the SYSCLK clock domain 20. For example, assuming the parameter tRAS is specified as nine (9) MEMCLK cycles, the parameter tRP is specified as three (3) MEMCLK cycles, and the frequency translation module 17 determines a frequency ratio of 1:3 (SYSCLK:MEMCLK), the scheduler 14 can translate the parameter tRAS to three (3) SYSCLK cycles (9×1/3) and translate the parameter tRP to one (1) SYSCLK cycle (3×1/3). Because clocks signals SYSCLK and MEMCLK typically are asynchronous, the translation provided by frequency translation module 17 may not be precise and an adjustment, such as by adding one cycle to each parameter, may be made to adjust for this imprecision without substantially affecting system performance.

Figure 2:
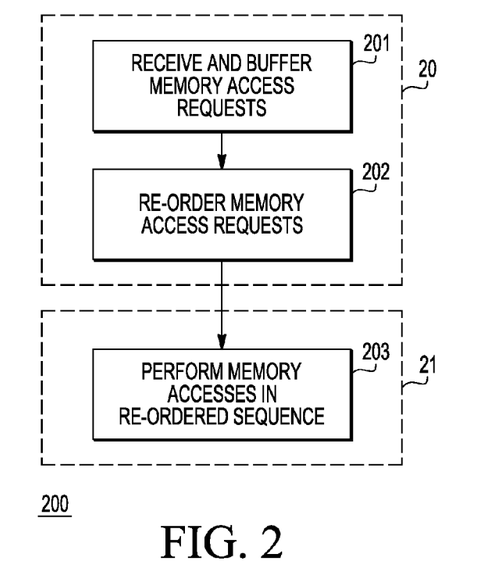
FIG. 2 is a flow diagram illustrating a method for asynchronously scheduling memory access requests in the data processing system of FIG. 1 in accordance with a specific embodiment of the present disclosure.

FIG. 2 is a flow diagram illustrating an example method 200 for asynchronously scheduling memory access requests in the data processing system 100 of FIG. 1 in accordance with at least one embodiment of the present disclosure. At block 201, the scheduler 14 receives memory access requests from one or more of the plurality of processor cores. Each memory access request is buffered at a request queue of the scheduler 14 until the memory access request is selected for servicing. In parallel with iterations of the process of block 201, the scheduler 14 selects, at block 202, a pending memory access request presently buffered at the request queue, forwards the selected memory access request to the memory controller 15, and removes the memory access request from the request queue. In one embodiment, the scheduler 14 selects a memory access request from the pending requests using an arbitration process described below. In another embodiment, the scheduler 14 can employ a conventional scheduling technique. In parallel with iterations of the processes of blocks 201 and 202, at block 203 the memory controller 15 services the memory access request by performing the corresponding memory access with the memory 16 subject to the current state of the memory 16 and the memory timing requirements of the memory 16.

Although FIG. 2 depicts the processes of blocks 201, 202, and 203 as a sequential flow for ease of illustration, it will be understood that iterations of these processes are performed independently and in parallel. Additional memory access requests can continue to be received and buffered at the request queue at substantially the same time that pending requests are sequentially removed from the request queue for servicing. However, the request queue has a finite number of entries, which can correspond to the maximum number of memory access requests that can be outstanding at one moment in time. In the event that the request queue is filled to capacity, scheduler 14 is unable to buffer a further request at block 201 until a pending request is selected for servicing at blocks 202 and 203 and thereby removed from the request queue.

In the illustrated example, the circuitry of the processor 10 that performs the processes of buffering and scheduling pending memory access requests, as represented by blocks 201 and 202, operates in the SYSCLK domain 20 (i.e., the circuitry is clocked by the clock signal SYSCLK). In contrast, the circuitry of the memory controller 15 that performs the process of servicing a selected memory access request, as represented by block 203, operates in the MEMCLK clock domain 21 (i.e., the circuitry is clocked by the clock signal MEMCLK). As noted above, this asynchronicity between the scheduling of pending memory access requests and the servicing of selected memory access requests can permit a greater number of pending memory access requests to be considered in the selection process, thereby resulting in a more optimal sequence of selected memory access requests that provides an improved overall memory access throughput.

Figure 3:
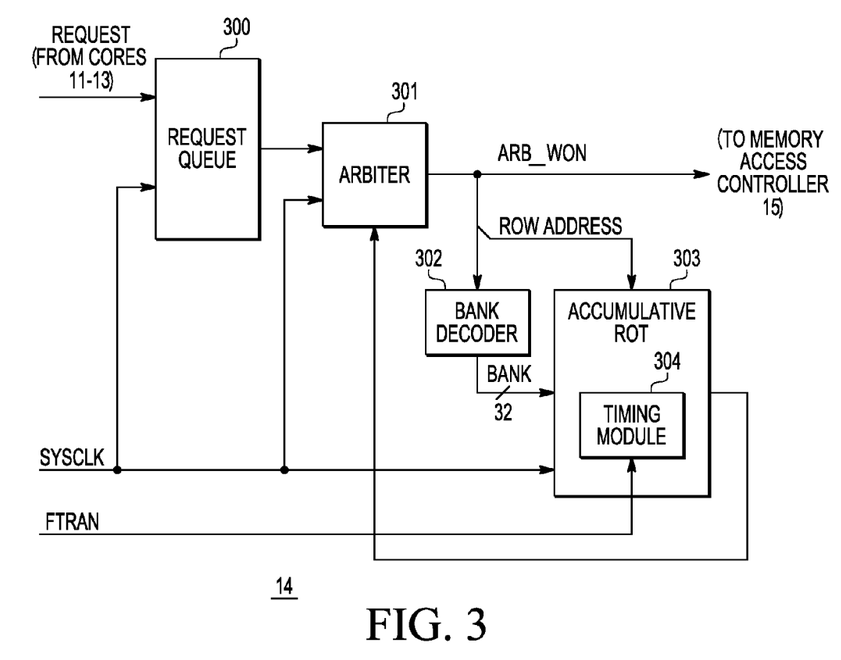
FIG. 3 is a block diagram illustrating an example implementation of a scheduler of the data processing system of FIG. 1 in accordance with a specific embodiment of the present disclosure.

FIGS. 3-6 illustrate in greater detail the improved arbitration process that can be employed by the scheduler 14 in scheduling pending memory access requests for servicing by the memory 16. FIG. 3 is a block diagram illustrating an example implementation of the scheduler 14 in accordance with at least one embodiment of the present disclosure. In the depicted example, the scheduler 14 includes a request queue 300, an arbiter 301, a bank decoder 302, an accumulate row-open table (AROT) 303, and a timing module 304.

The request queue 300 is configured to buffer pending memory access requests in the order that they are received. For example, an arriving memory access request is stored at the bottom of request queue 300 and, consequently, a memory access request at the top of the request queue 300 would be the oldest pending request stored at the request queue 300. The arbiter 301 operates to select the next pending memory access request that is to be serviced (as represented by the nomenclature "ARB_WON" in FIG. 3). In selecting the next pending memory access request, the arbiter 301 considers information pertaining to the pending memory access requests that are stored in the request queue 300 as well as information stored in the AROT 303 and pertaining to the current state and timings of the memory 16 due to memory access requests that were recently selected for servicing by the memory 16. The selected memory access request is removed from request queue 300, and the remaining pending memory access requests in entries below the entry of the selected memory access request are shifted towards the top entry of the request queue 300 to eliminate an empty entry corresponding to the serviced request, if any. The sequential arbitration and selection process continues as long as any pending request remains in the request queue 300.

In one embodiment, the AROT 303 includes a plurality of entries, each entry associated with a corresponding one of the banks of the memory 16. For example, the AROT 303 would have thirty-two entries when the memory 16 has thirty-two banks. Each entry stores information representing the predicted current state of the corresponding bank in view of recently-selected memory access requests addressed to the corresponding bank. Each time a pending memory access request is selected for servicing, the bank decoder 302 decodes the bank select portion of the address associated with the selected memory access request, and the bank select portion is used to identify an entry of the AROT 303 that corresponds to the bank of the memory 16 that is addressed by the selected memory access request. The state and timing information of the identified entry is updated to reflect the changes in predicted state of the memory 16 resulting from the selection and servicing of the memory access request. The state and timing information stored at each entry can include, for example, information identifying the row of the corresponding bank that is predicted to be currently OPEN or CLOSED, information identifying the remaining time before an ACTIVATE command can be issued to the corresponding bank, information identifying the remaining time before a PRECHARGE command can be issued to the corresponding bank, and information identifying the remaining time before an already-initiated precharge operation completes.

In one embodiment, the state and timing information of a corresponding entry of the AROT 303 reflects the state and timing of the corresponding bank relative to activation and precharge operations, initiated via the issuance of ACTIVATE and PRECHARGE commands, respectively. Each entry of the AROT 303 therefore can include representations of the current time remaining before a PRECHARGE command can be submitted to the corresponding bank, which is based on the parameter tRAS, and the current time remaining before an ACTIVATE command can be submitted to the corresponding bank, which is based on the parameter tRP. In certain implementations, the scheduler 14 may not be able to identify the exact point in time in which the memory controller 15 signals an ACTIVATE command or a PRECHARGE commands. To illustrate, when the scheduler 14 operates asynchronously with respect to the clock domain of the memory 16, it may take a number of clock cycles to translate current memory timing information received from the memory 16 from values relative to the memory clock domain to values relative to the system clock domain. Thus, the information stored in the AROT 303 can comprise a prediction of the current states of the corresponding banks of the memory 15 with regard to timings of ACTIVATE and PRECHARGE operations. To this end, the timing module 304 employs a plurality of counters to maintain the predicted timing information for the AROT 303. In particular, the timing module 304 includes counters to maintain a representation of the parameters tRP and tRAS with respect to each bank of memory 16. The operation of the AROT 303, the request queue 300, and the arbiter 301 can be better understood with reference to FIGS. 4-6.

Figure 4:
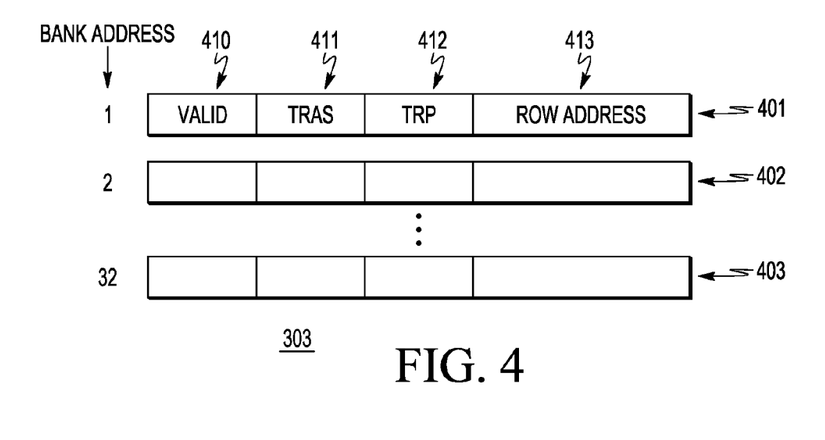
FIG. 4 is a block diagram illustrating an example implementation of an accumulating row open table of the scheduler of FIG. 3 in accordance with a specific embodiment of the present disclosure.

FIG. 4 is a block diagram illustrating an implementation of the AROT 303 of FIG. 3 in accordance with a specific embodiment of the present disclosure. In the depicted example, the AROT 303 includes thirty-two entries, including illustrated entries 401, 402, and 403, whereby each entry is associated with a corresponding one of thirty-two banks of memory 16. Each entry has a plurality of fields to store predicted timing and state information for the corresponding bank, including a valid field 410, a tRAS timing field 411, a tRP timing field 412, and a row address field 413. As noted above, the information in the AROT 303 reflects the predicted states of the banks of the memory 16 based on memory access requests that have already been selected for servicing by the memory 16.

The row address field 413 stores the row address of the memory access request most recently selected for the corresponding bank and thus identifies the most-recently accessed row of the corresponding bank. The valid field 410 stores a value that is used to identify whether the identified row is open or closed. The tRAS field 411 stores a value, identified herein as the value "PtRAS," that represents the predicted current time remaining before an ACTIVATE command can be issued to the corresponding bank, and the tRP field 412 stores a value, identified herein as the value "PtRP," that represents the predicted current time remaining before a PRECHARGE command can be issued to the corresponding bank.

In one embodiment, the memory controller 15 can be configured to service each memory access request in one of two modes: auto-precharge enabled; or auto-precharge disabled. Auto-precharge disabled mode can also be referred to as page mode. If auto-precharge is enabled for a memory access request represented in an entry of the AROT 303, the bit stored at the valid field 410 of the entry is cleared (set to a logic low value) to indicate that the row being accessed will be CLOSED following the present transaction. If auto-precharge is disabled, the bit stored at the valid field 410 is set to a logic high value to indicate that the row being accessed will remain OPEN following the corresponding memory access.

The AROT 303 is updated in response to at least two types of events: selection of a pending memory access request; and a new clock cycle of the clock signal used to clock the circuitry of the scheduler 14 (e.g., the clock signal SYSCLK of FIG. 1). When a pending memory access request is selected by the arbiter 301 for servicing, the entry of the AROT 303 corresponding to the bank addressed by the selected memory access request is updated to reflect the changes in the state of the corresponding bank due to the performance of the corresponding memory access operation. In the event that the row address of the selected pending memory access is different from the previous row address associated with this bank, the row address of the selected memory access request is stored to the row address field 413. Further, the tRAS field 411 is reset to a predetermined value PtRAS_max, which represents the minimum row-active delay (tRAS) associated with memory 16 in terms of clock cycles of the clock signal used to clock the scheduler 14. For example, if the minimum tRAS delay permitted by memory 16 is the equivalent of seven cycles of the clock SYSCLK, the value PtRAS in the tRAS field 411 is set to an initial value of seven. Similarly, when the selected memory access request is configured to be serviced with auto-precharge enabled, the tRP field 412 is reset to a predetermined value PtRP_max, which represents the sum of the minimum row-precharge delay (tRP) associated with memory 16 and an estimate of when the precharge operation will commence following the associated access in terms of clock cycles of the clock signal used to clock the scheduler 14. Otherwise, if auto-precharge is disabled for the selected memory access request, the tRP field 12 is set to zero (that is, PtRP is set to 0). At each new clock cycle, the timing module 304 accesses each entry of the AROT 303 and decrements the values PtRAS and PtRP therein by one (unless a value is already at zero) so as to reflect the passing of time.

The arbiter 301 uses the PtRAS values to predict whether the tRAS delay has expired for a corresponding bank and uses this information in selecting the next pending memory access request for servicing. To illustrate, if a pending memory access request specifies a row address that will result in a page miss, but the corresponding PtRAS value is zero and thus indicating that the tRAS delay for the bank has already expired, a PRECHARGE command can be immediately issued to the bank. In contrast, selection of a pending memory access request that will be a page miss and which is to a bank for which the corresponding PtRAS value is non-zero will incur a delay penalty while waiting for the tRAS delay to expire. Thus, the arbiter 301 can preferentially select pending memory access requests associated with expired tRP delays over pending memory access requests where the associated tRP delay has not expired.

The arbiter 301 uses the PtRP values to predict whether the tRP delay has expired for a corresponding bank and uses this information in selecting the next pending memory access request for servicing. To illustrate, if a pending memory access request specifies a row address corresponding to a closed row, but the corresponding PtRP value is zero, thereby indicating the tRP delay has already expired, the memory controller 15 can immediately issue an ACTIVATE command. In contrast, a pending memory access request that specifies a row address corresponding to a closed row, but the corresponding PtRP value is non-zero indicates that the tRP delay has not yet expired, and thus selection of this pending memory access will incur a delay penalty while waiting for the tRP delay to expire. Thus, the arbiter 301 can preferentially select pending memory access requests associated with expired tRAS delays over pending memory access requests where the associated tRAS delay has not yet expired.

Figure 5:
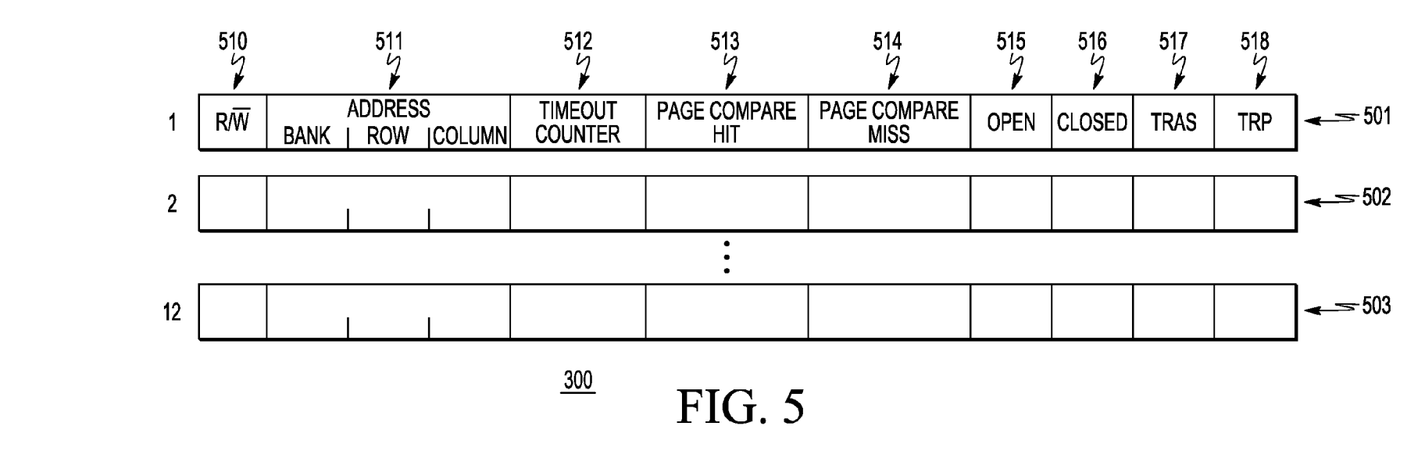
FIG. 5 is a block diagram illustrating an example implementation of the request queue of the scheduler of FIG. 3 in accordance with a specific embodiment of the present disclosure.

FIG. 5 is a block diagram illustrating an implementation of the request queue 300 in accordance with a specific embodiment of the present disclosure. Request queue 300 includes a plurality of entries, such as twelve entries represented by the illustrated entries 501, 502, and 503. A greater or a fewer number of entries can be included at request queue 300. Each entry serves to buffer a corresponding pending memory access request. Each entry has a plurality of fields related to the corresponding pending memory access request, including a read/write (R/W) field 510, an address field 511, a timeout field 512, a page_compare_hit field 513, a page_compare_miss field 514, an open field 515, a closed field 516, a tRAS field 517, and a tRP field 518. The R/W field 510 stores a value indicating whether the corresponding pending memory access request is a read access or a write access. The address field 511 stores at least a portion of the address associated with the pending memory access request. The timeout field 512 stores a value representing the number of times that the pending memory access request has been passed over for selection.

The open field 515 stores a bit that is set to a logic high value when the row associated with the corresponding memory access request is currently open, based on the assertion of the bit in the valid field 410 of the corresponding entry of the AROT 303. The closed field 516 stores a bit that is set to a logic high value when the row associated with the corresponding memory access request is currently CLOSED (the row is presently being precharged), based on the negation of the bit in the valid field 410 at AROT 303. Accordingly, if both the open field 515 and the closed field 516 of an entry contain a logic low value, the corresponding memory access request would result in a page miss if the arbiter 301 selected the memory access request for servicing at the present time.

The page_compare_hit field 513 of a particular entry stores information identifying other entries of request queue 300 that store pending memory access requests that are addressed to the same page as the pending memory request stored in the particular entry. That is, the page_compare_hit field 513 stores information that would identify other memory access requests that would result in a page hit if serviced immediately following the servicing of the pending memory request stored in the particular entry. To illustrate, the page_compare_ hit field 513 can store a bit vector, whereby each bit position of the bit vector is associated with a corresponding entry of the request queue 300. For example, a first bit of page_compare_hit field 513 is associated with entry 501, the second bit is associated with entry 502, and so on. A bit position of the bit vector is set to a logic high value if the entry associated with the bit position stores a pending memory access request that is addressed to the same page. Conversely, the bit position of the bit vector is set to a logic low value if the entry associated with the bit position stores a pending memory access request that is addressed to a different page. For example, the second bit of the page_compare_hit field 513 of entry 501 is set to a logic high value when the address associated with the memory access request stored at entry 502 includes the same bank and row address as the memory access request stored at entry 501. The arbiter 301 thus can use the bit vectors stored in the page_compare_hit fields 513 of the entries of the request buffer 300 to identify those pending memory access requests that are addressed to the same page. As described below, this information can be used by the arbiter 301 to preferentially select memory access requests so that memory access requests addressed to the same page are consecutively selected for servicing, and thus generating a consecutive series of page hits, so as to maximize memory access throughput. In the absence of a pending transaction that would hit on an open page, the scheduler 14 selects a pending transaction that will begin a series of subsequent page hits.

The page_compare_miss field 514 of a particular entry stores information identifying other entries of request queue 300 that store pending memory access requests that are addressed to a different pages than the pending memory request stored in the particular entry. That is, the page_compare_miss field 514 stores information that would identify other memory access requests that would result in a page miss if serviced immediately following the servicing of the pending memory request stored in the particular entry. As with the page_compare_hit field 513, the page_compare_miss field 514 can store a bit vector whereby each bit position is associated with a different entry of the request queue 300. For example, page_compare_miss field 514 can be used to prematurely interrupt an intended sequence of accesses.

Timeout field 512 is initialized to a specified value corresponding to a maximum latency acceptable for the corresponding memory access request. Each time the corresponding memory access request is bypassed by the arbiter 301 in favor of another pending memory access request, the value in the timeout 512 of the bypassed pending memory access request is decremented. The value in the timeout field 512 being decremented to zero signals to the arbiter 301 that the corresponding memory access request has reached the maximum acceptable latency for the memory access request and thus the arbiter 301 may preferentially select the memory access request for servicing. In one embodiment, the timeout fields 512 of different memory access requests may be initialized to different values based on the different priorities of the corresponding memory access requests. To illustrate, the timeout field 512 of an entry associated with a high-priority (low maximum latency) memory access request can be initialized to, for example, a value of two so as to specify that the corresponding memory access request can only fail to win arbitration, and thus be bypassed for servicing, a maximum of two times. In contrast, a low-priority (high maximum latency) memory access request can be initialized to, for example, a value of six so as to specify that the corresponding memory access request can fail to win arbitration up to six times before mandating selection of the memory access request. In certain implementations write accesses are treated as very low priority such that the timeout field 512 for a write access is set to a very high value or otherwise is not considered during the arbitration process.

In one embodiment, the tRAS field 517 and the tRP field 518 of a particular entry of request queue 300 is a copy of, or a pointer or other link to, the tRAS field 411 and the tRP field 412, respectively, of the entry of the AROT 303 that is addressed to the same bank as the memory access request in the particular entry of the request queue 300. Because multiple pending memory access requests represented in the request queue 300 may be addressed to the same bank, the request queue 300 may have multiple entries mapped to, or linked to, the tRAS field 411 and the tRP field 412 of the same entry of the AROT 303.

The information stored in the request queue 300 is updated both in response to receiving a pending memory access request from a processor core and in response to selection of a buffered pending memory access request for servicing by the memory 16. When a pending memory access request is received at the request queue 300, the arbiter 301 allocates an entry of the request queue 300 to the received memory access request and populates the corresponding fields of the allocated entry with the relevant information. The arbiter 301 also updates the other entries responsive to the particular characteristics of the received memory access request. This update process includes: storing the address information of the memory access request at the address field 511; initializing the timeout field 512 to an initial value associated with the priority of the received memory access request; accessing the AROT 303 to determine whether the row addressed by the received memory access request is currently open or closed in the corresponding bank and setting the open field 515 and the closed field 516 accordingly; analyzing the pages addressed by the other pending memory access requests in the request queue 300 and setting the page_compare_hit field 513 and the page_compare_miss field 514 accordingly. Further, the page_ compare_hit fields 513 and the page_compare_miss fields 514 of the other entries of request queue 300 are updated based on the received memory access request. When a pending memory access request is selected for servicing, the arbiter 301 deallocates the corresponding entry of the request queue 300 and updates the other entries of the request queue 300 to reflect the selection of the memory access request. This update process includes: decrementing the values stored in the timeout fields 512 of the other entries; and updating the page_compare_hit fields 513 and the page_compare_miss fields 514 of the other entries of the request queue 300 to reflect that the entry of the selected memory access request is empty.

Figure 6:
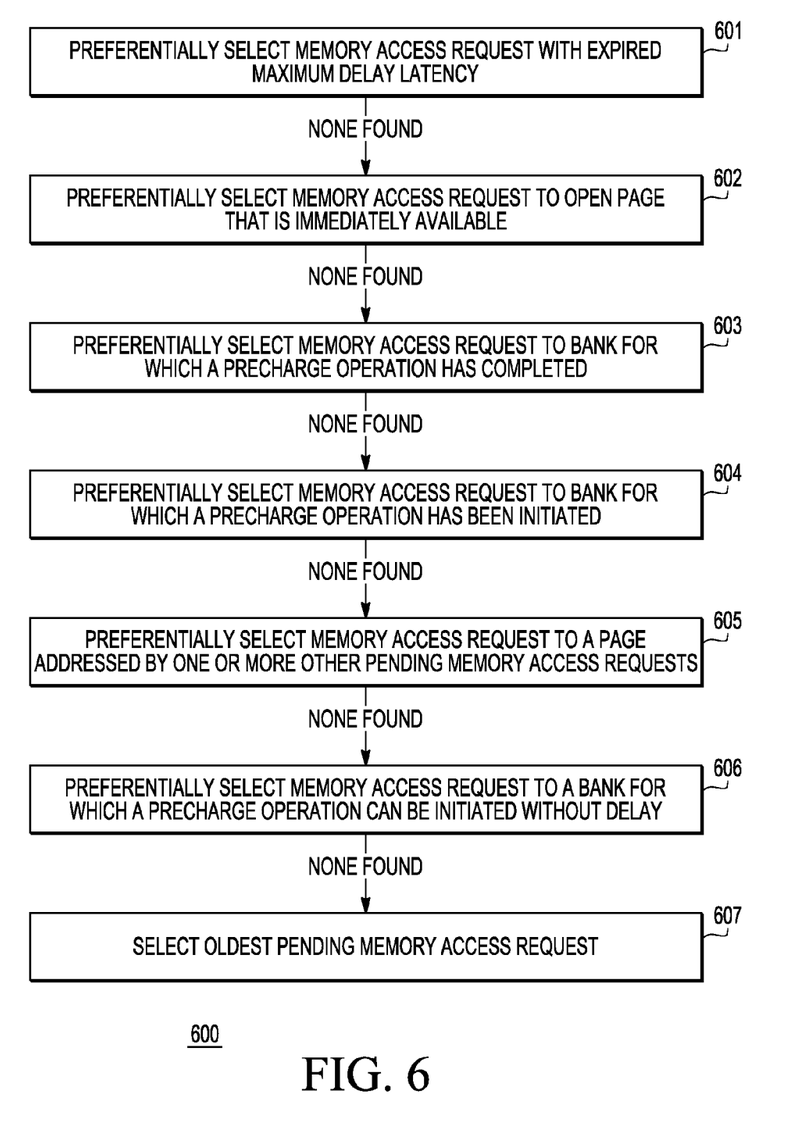
FIG. 6 is a flow diagram illustrating an example selection criteria hierarchy for scheduling memory access requests using memory timing and state information in accordance with a specific embodiment of the present disclosure.

FIG. 6 is a flow diagram illustrating an example implementation of the arbitration process employed by the arbiter 301 in selecting a memory access request for servicing by the memory 16 in accordance with a specific embodiment of the present disclosure. In particular, FIG. 6 illustrates an example hierarchy 600 of selection priorities in which the arbiter 301 selects pending memory access requests for servicing. While FIG. 6 illustrates one particular hierarchy of selection priorities, other hierarchies of selection priorities may be implemented without departing from the scope of the present disclosure. Further, although FIG. 6 illustrates a particular combination of selection priorities, other combinations of selection priorities may be implemented and the arbitration process is not limited to only the selection priorities described herein.

The arbitration process represented by hierarchy 600 initiates once there is at least one pending memory access request represented in the request queue 300. As represented by block 601, under the hierarchy 600 the arbiter 301 preferentially selects from the request queue 300 a pending memory access request for which the maximum latency delay has expired. As discussed above, the maximum latency delay for a pending memory request represents the maximum number of times that a pending memory access request is permitted to be bypassed for selection in favor of another pending memory access request. Accordingly, the arbiter 301 accesses the timeout fields 512 of the request queue 300 to determine whether any timeout field 512 is currently at zero, and thus identifying the pending memory access request in the corresponding queue as having reached the maximum latency delay. In the event that there are multiple entries with a timeout field 512 having a value of zero, the arbiter 301 can preferentially select the oldest of the corresponding memory access requests or, alternatively, the memory access request with the highest priority.

In the event that no memory access requests with an expired maximum delay latency are identified, at block 602 the arbiter 301 preferentially selects from the request queue 300 a pending memory access request that is addressed to a currently open page and thus avoiding delay that would otherwise be required to perform an activate operation. As noted above, an asserted bit in the open field 515 of an entry of the request queue 300 identifies the corresponding pending memory access request as being addressed to an open page. Thus, the arbiter 301 can access the open field 515 of each entry of the request queue 300 identify any pending memory access requests meeting the criteria of being addressed to a currently open page. In the event that multiple memory access requests meeting this criterion are identified, the arbiter 301 can select the oldest pending memory access request or, alternatively, the highest-priority pending memory access request.

In the event that no memory access requests addressed to an open page are identified, at block 603 the arbiter 301 preferentially selects from the request queue 300 a pending memory access request that is addressed to a bank of the memory 16 for which a precharge operation has completed. In this instance, the bank would be ready for initiation of an activate operation without further delay. As noted above, an asserted bit in the closed field 516 of an entry of the request queue 300 identifies the corresponding pending memory access request as being addressed to a closed page. As also noted above, a value of zero for the PtRP value in the tRP field 518 of an entry of the request queue 300 identifies the corresponding memory access request as being addressed to a bank for which either no precharge operation is pending or for which a precharge operation has been completed. Thus, the arbiter 301 can access the closed field 516 and the tRP field 518 of each entry of the request queue 300 to identify any entries that have both an asserted bit in the closed field 516 and a value of zero in the tRP field 518, thereby indicating that the corresponding memory access request meets the criteria of being addressed to a bank of the memory 16 for which a precharge operation has completed. In the event that multiple memory access requests meeting this criterion are identified, the arbiter 301 can select the oldest pending memory access request or, alternatively, the highest-priority pending memory access request.

In the event that no memory access requests addressed to a bank of memory 16 for which a precharge operation has completed are identified, at block 604 the arbiter 301 preferentially selects from the request queue 300 a pending memory access request that is addressed to a bank of memory 16 for which a precharge operation has been initiated. In this instance, only a relatively small delay would be needed before an activate command could be issued to the bank. In one embodiment, the arbiter 301 can access the closed field 516 and the tRP field 518 of each entry of the request queue 300 to identify any entries that have both an asserted bit in the closed field 516 and non-zero value in the tRP field 518, thereby indicating that the corresponding memory access request meets the criterion of being addressed to a bank of memory 16 for which a precharge operation has been initiated. In the event that multiple memory access requests meeting this criterion are identified, the arbiter 301 can select the oldest pending memory access request or, alternatively, the highest-priority pending memory access request.

In the event that no memory access requests addressed to a bank of the memory 16 for which a precharge operation has been initiated, at block 605 the arbiter 301 preferentially selects from the request queue 300 a pending memory access request that is addressed to a page that is also addressed by one or more other pending memory access requests present in the request queue 300. In this instance, each of the two or more pending memory access requests could then be selected in sequence such that each successive pending memory request in the sequence following the first would result in a page hit and thus incur no additional delay that otherwise would be required to conduct an activate operation or a precharge operation. As described above, the page_compare_hit field 513 of a particular entry of the request queue 300 identifies any other entries of the request queue 300 that are associated with memory access requests that are addressed to the same page. The arbiter 301 therefore may access the page_compare_hit field 513 of each entry to identify memory access requests that meet this criterion. In the event that multiple memory access requests meet this criterion, the arbiter 301 can select the oldest pending memory access request or the highest-priority pending memory access request. Alternatively, the arbiter 301 can select the memory access request having the greatest number of pending memory access requests addressed to the same page, as indicated by, for example, the number of asserted bits in the bit vector stored in the page_compare_hit field 513.

In the event that the request queue 300 is not identified as having multiple pending memory access requests addressed to the same page, at block 606 the arbiter 301 preferentially selects from the request queue 300 a pending memory access request that is addressed to a bank of the memory 16 for which a precharge operation can be initiated without further delay. As noted above, the PtRAS value stored in the tRAS field 517 represents the current time remaining before a PRECHARGE command can be issued to the corresponding bank. Accordingly, the arbiter 301 can access the tRAS field 517 of each entry of the request queue 300 to identify pending memory access requests having a corresponding PtRAS value of zero. In the event that multiple memory access requests meet this criterion, the arbiter 301 can select the oldest pending memory access request or the highest-priority pending memory access request.

In the event that no pending memory requests meet the selection criteria discussed above, at block 607 the arbiter 301 can default to selection of the oldest pending memory access request in the request queue 300. Alternatively, the arbiter 301 can default to selection of the highest-priority pending memory access request in the request queue 300.

As described above, while FIG. 6 illustrates one example of a selection criteria hierarchy used by the arbiter 301 to select pending memory access requests for servicing, other hierarchies using some combination of one or more of these selection criteria may be implemented. To illustrate, in an alternate hierarchy, those pending memory access requests being addressed to the same page (as discussed at block 605) may be preferentially selected over memory access requests being addressed to a bank for which a precharge operation has been initiated (as discussed at block 604). As another example, the criteria of the maximum delay latency (as discussed at block 601) or the criteria of the initiation of a precharge operation to the corresponding block (as discussed at block 604) may be omitted from consideration in the arbitration process or considered at a lower level in the selection hierarchy than that shown in FIG. 6.

As previously described, a DDR memory includes a plurality of memory timing and state information, of which tRP and tRAS are but two examples. One skilled in the art will appreciate that other timing and state information associated with the DDR memory can be used by the scheduler 14 to select a pending memory access request for servicing. For example, timing information representative of memory write-to-precharge delays, read-to-precharge delays, and the like, can be modeled and used to select a preferred request from pending memory access requests.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In a data processing system comprising a scheduler and one or more processor cores coupled to a memory by a memory access controller, a method comprising:
   scheduling by the scheduler pending memory access requests for servicing by the memory using a first clock signal having a first frequency, the scheduling comprising determining an order in which to service the pending memory access requests; and
   servicing the scheduled pending memory access requests by the memory access controller using a second clock signal having a second frequency different than the first frequency, wherein:
      the memory access controller maintains memory timing and state information for administering the servicing of the scheduled pending memory access requests;
      the determining comprises determining the order based upon predictions by the scheduler of the memory timing and state information maintained by the memory access controller for administering the servicing of the scheduled pending memory access requests; and
      the scheduling includes removing the pending access requests from a queue of pending memory access requests and sending them to the memory access controller for servicing.

2. The method of claim 1, wherein the first frequency is lower than the second frequency.

3. The method of claim 1, wherein scheduling pending memory access requests comprises scheduling pending memory access requests using first memory timing and state information for memory access requests previously selected for servicing and using second memory timing and state information for the pending memory access requests.

4. The method of claim 3, wherein the first memory timing and state information comprises information predicting, for each bank of the memory, an open row of the bank and information predicting at least one of: a time remaining before an activate operation can be initiated for the bank; a memory write-to-precharge delay, a memory read-to-precharge delay, and a time remaining before a precharge operation can be initiated for the bank.

5. The method of claim 4, further comprising:
   determining a relationship between the first frequency and the second frequency; and
   determining, based on the relationship, at least one of: a first minimum delay between initiation of a precharge operation to close a row of a bank of the memory and initiation of an activation operation to open a different row of the bank; and a second minimum delay between initiation of an activate operation for a bank of the memory and subsequent initiation of a precharge operation for the bank, wherein the first memory timing information for the rows of the banks of the memory is stated in terms of the second frequency, and the determining the at least one comprises converting, based on the relationship, the first memory timing information to memory timing information stated in terms of the first frequency; wherein the time remaining before an activate operation can be initiated for the bank is initially set based on the first minimum delay; and
   wherein the time remaining before a precharge operation can be initiated for the bank is initially set based on the second minimum delay.

6. The method of claim 4, wherein the second memory timing and state information comprises information identifying which pending memory access requests are addressed to a common page of the memory.

7. The method of claim 1, wherein the scheduling further comprises:
   maintaining by the scheduler the predictions of the memory timing and state information;
   scheduling by the scheduler one of the pending memory access requests for servicing, the pending memory access request a request for access to a row of a bank of the memory;
   setting a row active time parameter of the predictions of the memory timing and state information for the row to a first fixed value based upon the scheduling;
   setting a row precharge time parameter of the predictions of the memory timing and state information for the row to a second fixed value based upon the scheduling; and
   decrementing both the row active time parameter and the row precharge time parameter per each clock cycle of the first clock signal.

8. The method of claim 7, wherein:
   the setting the row active time parameter and the setting the row precharge time parameter comprise maintaining a table, the table containing entries for a row active time parameter and a row precharge time parameter for a row of each bank of the banks of memory; and
   the setting the row active time parameter comprises resetting the value of the row active time parameter based upon sending another of the pending memory access requests to the memory controller for servicing.

9. A method performed in a data processing system comprising one or more processor cores, a memory, a memory controller to conduct memory access operations with the memory, and a scheduler to schedule pending memory access requests for servicing by the memory, the method comprising:
   operating the scheduler in a first clock domain associated with a first clock signal having a first frequency, wherein the operating comprises determining an order in which the pending memory access requests are serviced by the memory; and
   operating the memory controller in a second clock domain associated with a second clock signal having a second frequency different than the first frequency, wherein:
      memory controller maintains memory timing and state information for administering the servicing of the scheduled pending memory access requests;
      the scheduler maintains predictions of the memory timing and state information maintained by the memory controller for administering the servicing of the pending memory access requests;
      the determining comprises determining the order based upon the predictions maintained by the scheduler of the memory timing and state information maintained by the memory controller for administering the servicing of the pending memory access requests; and the scheduling comprises removing the pending access requests from a queue of pending memory access requests and sending them to the memory controller for servicing.

10. The method of claim 9, wherein the first frequency is lower than the second frequency.

11. The method of claim 9, further comprising operating the memory in the second clock domain.

12. The method of claim 9, wherein the scheduler is to schedule pending memory access requests using first memory timing and state information for memory access requests previously selected for servicing and using second memory timing and state information for the pending memory access requests.

13. The method of claim 12, wherein:
the first memory timing and state information comprises information predicting, for each bank of the memory, an open row of the bank and information predicting at least one of: a time remaining before an activate operation can be initiated for the bank; and a time remaining before a precharge operation can be initiated for the bank; and
the predictions of the memory timing and state information maintained by the scheduler comprise the first memory timing and state information; and
the second memory timing and state information comprises information identifying which pending memory access requests are addressed to a common page of the memory.

14. The method of claim 13, further comprising:
determining a relationship between the first frequency and the second frequency; and
determining, based on the relationship, at least one of: a first minimum delay between initiation of a precharge operation to close a row of a bank of the memory and initiation of an activation operation to open a different row of the bank; and a second minimum delay between initiation of an activate operation for a bank of the memory and subsequent initiation of a precharge operation for the bank;
wherein the time remaining before an activate operation can be initiated for the bank is initially set based on the first minimum delay; and
wherein the time remaining before a precharge operation can be initiated for the bank is initially set based on the second minimum delay.

15. A data processing system comprising:
at least one processor;
a memory controller to:
service, using a first clock signal, scheduled memory access requests for a memory, the first clock signal having a first frequency; and
maintain memory timing and state information for administering the servicing of the scheduled memory access requests; and
a scheduler to schedule, using a second clock signal, memory access requests of the data processing system for servicing by the memory controller, the second clock signal having a second frequency different than the first frequency, wherein:
the scheduling comprising determining an order in which to service the pending memory access requests;
the scheduling includes removing pending access requests from a queue of pending memory access requests and sending them to the memory controller for servicing; and
the determining comprises determining the order based upon predictions of the memory timing and state information maintained by the memory access controller for administering the servicing of the scheduled pending memory access requests.

16. The data processing system of claim 15, wherein the second frequency is lower than the first frequency.

17. The data processing system of claim 15, wherein the scheduler is to schedule pending memory access requests using first memory timing and state information for memory access requests previously selected for servicing and using second memory timing and state information for the pending memory access requests.

18. The data processing system of claim 17, wherein:
the first memory timing and state information comprises information predicting, for each bank of the memory, an open row of the bank and information predicting at least one of: a time remaining before an activate operation can be initiated for the bank; and a time remaining before a precharge operation can be initiated for the bank; and
the predictions of the memory timing and state information comprise the first memory tuning and state information.

19. The data processing system of claim 18, further comprising:
a frequency translation module comprising an input to receive the first clock signal, an input to receive the second clock signal, and an output to provide an indicator of a relationship between the first frequency and the second frequency; and
wherein the scheduler is to determine, based on the relationship, at least one of: a first minimum delay between initiation of a precharge operation to close a row of a bank of the memory and initiation of an activation operation to open a different row of the bank; and a second minimum delay between initiation of an activate operation for a bank of the memory and subsequent initiation of a precharge operation for the bank;
wherein the time remaining before an activate operation can be initiated for the bank is initially set based on the first minimum delay; and
wherein the time remaining before a precharge operation can be initiated for the bank is initially set based on the second minimum delay.

20. The data processing system of claim 18, wherein the second memory timing and state information comprises information identifying which pending memory access requests are addressed to a common page of the memory.

* * * * *